United States Patent
Rahman

(10) Patent No.: US 10,230,833 B2
(45) Date of Patent: Mar. 12, 2019

(54) PREVENTING TEXTING WHILE DRIVING

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/475,632

(22) Filed: Mar. 31, 2017

(65) Prior Publication Data

US 2018/0288215 A1  Oct. 4, 2018

(51) Int. Cl.
*H04M 1/725* (2006.01)
*H04W 4/14* (2009.01)
*H04W 4/02* (2018.01)

(52) U.S. Cl.
CPC ......... *H04M 1/72577* (2013.01); *H04W 4/14* (2013.01); *H04W 4/027* (2013.01)

(58) Field of Classification Search
CPC .... H04M 1/72577; H04W 4/14; H04W 4/027
See application file for complete search history.

(56) References Cited

U.S. PATENT DOCUMENTS

| | | | | |
|---|---|---|---|---|
| 2009/0285129 | A1* | 11/2009 | Swanburg | H04L 29/12047 370/259 |
| 2010/0020786 | A1* | 1/2010 | Futaki | H04W 56/0005 370/350 |
| 2015/0163210 | A1* | 6/2015 | Meyers | H04L 63/10 726/4 |
| 2015/0172450 | A1* | 6/2015 | Singhal | H04M 1/72577 455/419 |
| 2015/0181414 | A1* | 6/2015 | Bretscher | H04W 4/12 455/418 |

* cited by examiner

*Primary Examiner* — Joseph E Dean, Jr.
(74) *Attorney, Agent, or Firm* — Lee & Hayes, P.C.

(57) ABSTRACT

A wireless communication device is configured to determine a speed at which it is moving based on timing advance values, which are provided by a base station in order to synchronize TDMA communications. The timing advance values are received at periodic intervals, and indicate by how much time the device should advance its data bursts so that they arrive at the base station within the correct TDMA timeslot. Each timing advance value can be multiplied by the length of a timeslot and by the propagation speed of radio waves to determine the distance of the device from the base station. The speed of the device can be determining by analyzing changes in this distance over time. When the device detects that it is moving at greater than a threshold speed, the device disables certain activities or functions that might be distracting to a driver of a vehicle.

28 Claims, 3 Drawing Sheets

PREVENTING TEXTING WHILE DRIVING

BACKGROUND

The proliferation of mobile communication devices such as smartphones and other wireless telephone handsets has enabled people to be constantly in touch with each other. While mobile handsets may at one time have been used primarily for voice communications, people are increasingly using mobile devices for various other types of communications such as text messaging.

Texting while driving is a significant cause of automobile accidents and death. In order to read a text message, a driver must take his or her eyes from the road for at least several seconds, during which many different things might happen to cause a crash. In addition, composing a text message often requires the driver to take at least one hand from the steering wheel.

Many studies have shown that a driver is much more likely to be in an accident if he or she is texting, and that texting is one of the most dangerous activities that can be performed with a communication device while driving. It has been estimated that one in four accidents in the United States is caused by texting while driving.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
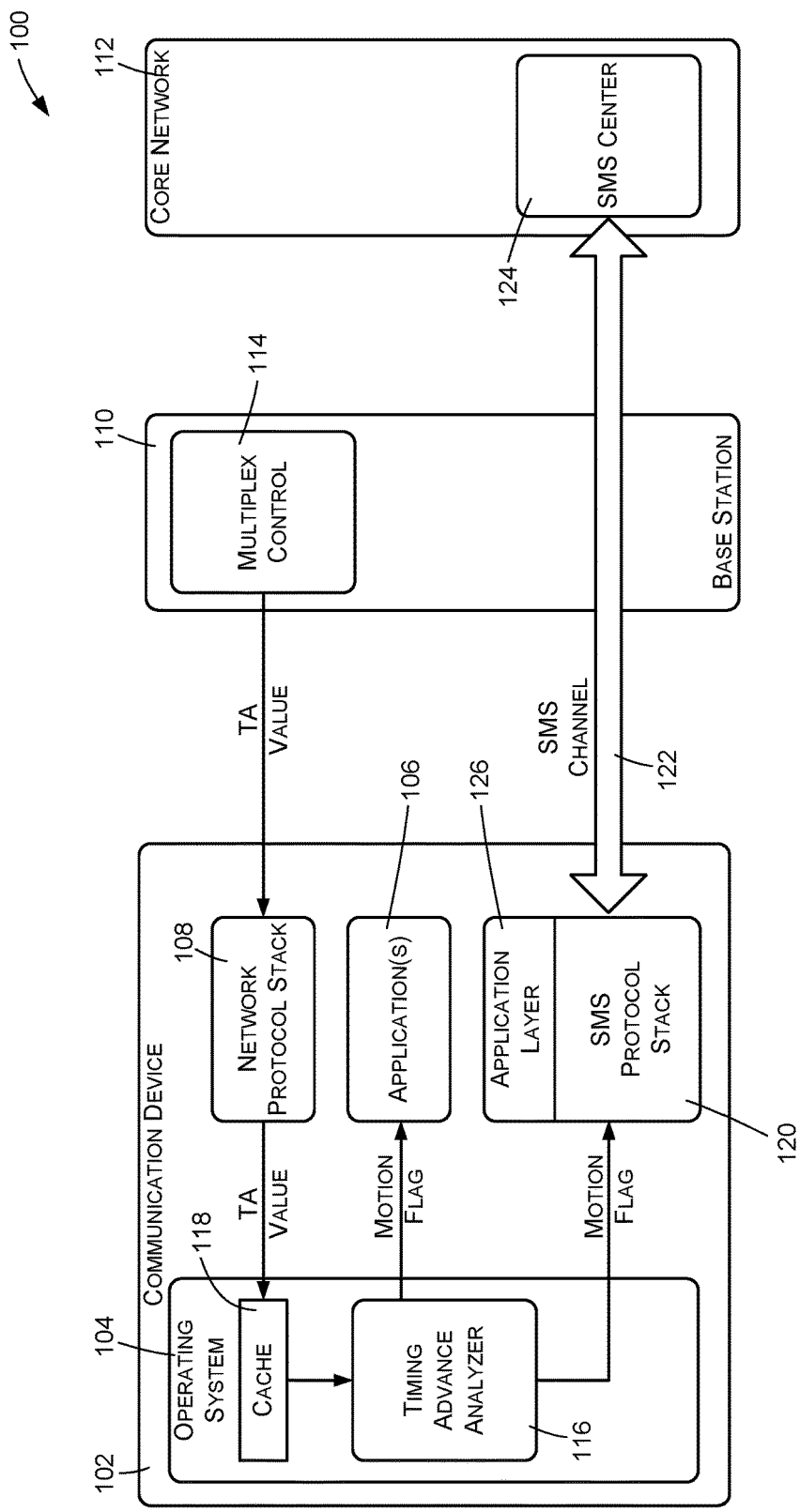
FIG. 1 is a block diagram of a system in which a communication device can be configured to disable text messaging when the communication device is being carried by a user who is driving.

Described herein are techniques for preventing text messaging (texting) while driving. These techniques can be implemented within a mobile device at little or no additional cost, in order to disable or block activities relating to text messaging when it is determined that the device is in motion.

In cellular communication systems such as GSM (Global System for Mobile Communications), UMTS (Universal Mobile Telecommunications System), and LTE (Long-Term Evolution), a wireless device or other mobile communication device communicates with a base station using a frequency that is shared between several devices, using what is referred to as Time Division Multiple Access or TDMA. A TDMA signal is divided into sequential timeslots that are assigned respectively to different devices. Thus, each device has a corresponding recurring timeslot that can be used for data transmissions. More specifically, an individual device is configured to schedule its transmissions so that they arrive at the base station during the recurring timeslot assigned to the device.

As the device is moved closer to or further from the base station, the propagation times of signals from the device to the base station vary significantly relative to the duration of the individual timeslots. Unless this is corrected for, communications from the device may arrive late at the base station when the device moves away from the base station. The device accounts for this by advancing the timing of its transmissions as it gets further from the base station, so that the transmissions will still arrive within the correct timeslots.

The appropriate timing advance is determined by the base station, which periodically provides to the device a timing advance value or an update to timing advance value. The timing advance value indicates the amount by which the transmissions of the device should be advanced. Upon receiving each new timing advance value or update, the device adjusts the timing of its transmissions in accordance with the new timing advance value. The base station determines the timing advance value by monitoring the timing of communications received from the device.

The operating system of the device is configured to collect and store the most recent timing advance values. As each new timing advance value or update is received, the operating system analyzes the stored timing advance values to determine the current speed at which the device is moving. If the device is moving at greater than a threshold speed, the device is considered to be in use by a user who is driving, and certain functionality of the device may be disabled. Generally, any functions that might cause driver distraction may be disabled. More specifically, various forms of text messaging, and specifically short text message (SMS) text messaging, are disabled to prevent driver distraction.

The estimated speed of the device can be determined by (a) calculating a difference in the times indicated by two timing advance values, (b) multiplying the difference by the propagation speed of radio waves to determine a distance that the device has moved, and (c) dividing the distance by the amount of time between the two timing advance values. In certain embodiments, a speed is calculated for each of multiple consecutive pairs of timing advance values to produce multiple speed values, which are further analyzed to determine an estimated speed of the device. For example, the multiple speed values may be averaged to determine the estimated speed. In some cases, such an average may be weighted, such as by giving higher weight to more recently received timing advance values. In some cases, certain of the speed values may be disregarded when determining an average, such as by discarding the lowest speed value and the highest speed value.

The estimated speed is then compared to the threshold speed to determine whether the device is being used by someone in a moving vehicle. As an example, the threshold speed may be set at a value that is greater than a normal walking speed, such as at 5 miles per hour.

The estimated speed may be updated frequently as new timing advance values are received, and various applications may query the operating system to receive the estimated speed. The applications may be configured to disable certain functionality when the estimated speed is greater than the threshold speed.

In a specific embodiment, an SMS protocol stack of the device is modified to receive an indication from the operating system of whether the device is likely to be in a moving vehicle, based on analysis of the timing advance values as described above. This indication is used by the SMS protocol stack as a prerequisite for sending SMS text messages. Specifically, the SMS protocol stack is configured to prevent display or sending of text messages when the device is likely to be in a moving vehicle. Integration of this functionality in the SMS protocol stack may in some cases be advantageous because of the control over the SMS protocol stack by cellular operators. Specifically, a cellular communications operator can integrate this functionality in a way that is difficult for a user to defeat.

FIG. 1 shows an example implementation in which a communication device 102 is configured to detect when it is in motion and in response to disable certain functionality to prevent distracted driving. The communication device 102 may comprise any of various types of communication devices, including devices, wireless telephones, smartphones, tablet computers, wearable devices, automation devices, controllers, etc. The communication device 102 has an operating system 104 that oversees operations of the communication device 102 and supports the execution of one or more applications 106.

The communication device 102 has a network protocol stack 108 that enables communications by the communication device 102 with a base station 110. A backhaul (not shown) connects the base station 110 with the core network 112 of the mobile communications system. The base station 110 and the core network 112 may be part of a cellular communication system such as a GSM system, a UMTS system, an LTE system, or any other communication network that supports mobile communication devices.

The network protocol stack 108 communicates with the base station 110 using TDMA (Time Division Multiple Access). TDMA allows a single communication channel, on a single frequency, to be shared between multiple communication devices. Specifically, the communication channel is divided into periodically repeating frames. Each frame is divided into multiple timeslots, which are assigned respectively to different communication devices. For example, each frame might have 8 timeslots, which are assigned respectively to 8 different communication devices. Any given one of the communication devices is allowed to transmit only during its assigned timeslot, which occurs repeatedly within sequential frames. In operation, the communication device 102 schedules periodic transmissions of data bursts corresponding respectively to the frames of the communication channel. Each data burst is scheduled so that it arrives at the base station 110 during the assigned timeslot of the respective frame. Note that the timeslots may also be referred to as burst periods.

The base station 110 periodically sends updates to the network protocol stack 108 of the communication device 102, wherein the updates specify a timing advance value (TA) in the form of an absolute value or a relative adjustment. In certain LTE systems, the timing advance value is maintained as an integer ranging from 0 to 1262, indicating the amount by which transmitted data bursts should be advanced in time in order to reach the base station 110 within the burst period assigned to the communication device 102. Each increment of the timing advance value represents a single bit period, which is 0.52 microseconds in LTE systems. A TA value of 1 therefore indicates that transmissions should be advanced by 0.52 microseconds in order to arrive at the base station 110 at the correct time. A TA value of 2 indicates that transmissions should be advanced by 2×0.52 (1.04) microseconds in order to arrive at the base station 110 at the correct time. TA values are sent periodically to the network protocol stack by a multiplex controller 114 of the base station 110 over a control channel.

In LTE systems, during initial attach an initial 11-bit absolute TA value is communicated by the base station 110 to the communication device 102 as part of Media Access Control (MAC) Random Access Response (RAR) messaging. Subsequently, after the communication device 102 is attached, relative 6-bit TA values are sent by the base station 110 using MAC Control Element (CE) messages. An 11-bit TA value is maintained by the communication device 102 by storing the initially received absolute TA value, and then by adjusting the stored TA value by each subsequently received 6-bit relative TA value. In LTE systems TA has a maximum value of 1282. Each increment of the TA value in LTE systems represents 0.52 microseconds.

In GSM systems, an absolute TA value is periodically sent from a base station to a communication using the SACCH (Slow Associated Control Channel). In this environment, the maximum TA value is 63. Each increment of the TA value in GSM systems represents 3.69 microseconds.

In the following description, it will be assumed that the communication device 102 receives periodic updates to a timing advance value, resulting in a sequence of timing advance values over time. Each update may comprise an absolute TA value or alternatively may comprise an adjustment value indicating an incremental amount by which the TA value has changed or is to be changed.

Further details regarding TDMA timing, as well as the determination and use of timing advance values for frame synchronization, can be found in applicable standards such the 3rd Generation Partnership (3GPP) standards used in LTE systems and the GSM standards used in 2G systems In the described embodiment, the operating system 104 has a timing advance analyzer 116 that analyzes recent timing advance values to determine whether it is likely that the communication device 102 is in a moving vehicle. More specifically, the timing advance analyzer 116 calculates and/or records timing advance values based on updates that are received from the network protocol stack 108, analyzes the recorded timing advance values to estimate the speed at which the communication device 102 is moving, and compares the estimated speed to a threshold speed to determine whether the communication device 102 is in a moving vehicle.

Speed estimation may be based upon the relationship of each timing advance value to the distance between the communication device 102 and the base station 110. Specifically, the distance between the communication device 102 and the base station 110 at any time can be calculated by first determining the timing advance represented by the most recent TA value (such as multiplying the TA value by 0.52 microseconds) and multiplying the determined timing advance by the propagation speed of radio waves (about 300 meters per second or 0.0003 meters per microsecond) as follows:

$$\text{distance} = \frac{TA * T}{2} * v_{prop} \qquad \text{Equation 1}$$

where * indicates multiplication, TA is the timing advance value, T is length of time represented by each step of the timing advance parameter (0.52 microseconds in some embodiments), and $v_{prop}$ is the propagation speed of radio waves.

In LTE embodiments in which TA is 0.52 microseconds, TA=1 corresponds to 78.12 meters. The resolution of TA is therefore 78.12 meters, and the distance represented by any particular TA value is therefore 78.12*TA, where "*" indicates multiplication. TA values have maximum values of 1282. Accordingly, a TA value in these embodiments can specify a maximum distance of 78.12*1282=100.15 kilometers.

In GSM embodiments in which TA is 3.69 microseconds, TA=1 corresponds to 1107 meters. The resolution of TA is therefore 1107 meters, and the distance represented by any particular TA value is therefore 1107*TA. The maximum possible TA value in this environment is 63. Accordingly, TA in these embodiments can specify a maximum distance of 1107*63=35 kilometers.

The speed of the communication device 102 can be calculated as the difference between the distances corresponding to two TA values, divided by the time between receiving the TA updates corresponding to the values, as follows:

$$\text{speed} = \frac{d_2 - d_1}{t_2 - t_1} \qquad \text{Equation 2}$$

where $d_1$ is the distance corresponding to a first TA value, $t_1$ is the time at which the update corresponding to the first TA value was received, $d_2$ is the distance corresponding to a second TA value, and $t_2$ is the time at which the update corresponding to the second TA value was received.

Equations 1 and 2 can be represented as a single equation that calculates speed based on the difference between two TA values $TA_1$ and $TA_2$:

$$\text{speed} = \frac{TA_2 - TA_1}{t_2 - t_1} * T * v_{prop} \qquad \text{Equation 3}$$

The calculations described above can of course be performed in different ways, such as by first determining the difference between two TA values, converting that difference to a distance, and then dividing the distance by the difference in time between receiving the updates corresponding to the two TA values. As another alternative, differences in timing advance values may be compared to an appropriate threshold, without explicitly calculating speeds.

The timing advance analyzer 116 may be configured to store a number of most recently received or updated timing advance values in a memory cache 118 or to store the distances corresponding to the timing advance values in the cache 118, and to estimate the current speed at which the communication device 102 is traveling based on multiple stored timing advance values, corresponding distances, or corresponding speeds. For example, a speed may be calculated for each pair of adjacently received timing advance values or updates. Multiple speeds calculated in this manner, corresponding respectively to different pairs of TA values, may be averaged or compared to estimate a current speed of the communication device 102. As one example, the multiple speeds determined in this way may be averaged to determine an estimated speed. In some cases, the multiple speeds may be weighted before averaging, so that calculated speeds corresponding to more recently received timing advance values are weighted relatively higher than speeds corresponding to less recently received timing advance values.

The timing advance analyzer 116 then compares the estimated speed with a threshold speed to determine whether the communication device 102 is likely within or being carried by a user who is within a moving vehicle. The threshold speed may be selected as a speed that is somewhat above a normal walking speed, for example, such as 5 miles per hour.

The timing advance analyzer 116 may produce a motion flag that can be obtained by applications and other executable components of the communication device 102. The motion flag, for example, may have a value of TRUE when the communication device 102 is moving at greater than the threshold speed and a value of FALSE when the communication device 102 is not moving at greater than the threshold speed.

The communication device 102 may have one or more applications 106, any one of which may query the timing advance analyzer 116 to obtain the motion flag. Any application 106 may be configured to disable some of its functionality when the motion flag has a TRUE value, indicating that the communication device 102 is moving. For example, a messaging or chat application may be configured to disable sending and receiving messages, and/or may disable the portion of its user interface that is used to compose or read messages.

Note that in some alternative embodiments, the timing advance analyzer may output the estimated speed rather than a binary TRUE/FALSE value, and the component receiving this information may perform the comparison to the threshold speed. In these embodiments, multiple applications might be configured to obtain the estimated speed and to use different threshold speeds to determine whether the communication device 102 is moving. Applications might also use the estimated speed for purposes other than disabling user activities to prevent distracted driving.

The communication device 102 may also have an SMS protocol stack 120 that provides SMS text messaging capabilities of the communication device 102. An SMS protocol stack is typically designed or configured by an operator of a cellular network to provide compatibility with the SMS services of the cellular network.

The SMS protocol stack 120 may communicate, using a logical SMS channel 122 through the base station 110, with an SMS center 124 of the core network 112. The SMS center 124 may be part of an SMS system that implements traditional store-and-forward message communications, such as is commonly used in cellular networks. In embodiments used in conjunction with GPRS-based systems, the logical SMS channel 122 may be established through the Logical Link Control (LLC), which also conveys other information.

The SMS protocol stack 120 may be configured to block text messages by disabling text messaging or certain aspects of text messaging when the communication device 102 is in motion. Specifically, a layer of the SMS protocol stack 120 may be configured to query the operating system 104 to obtain the motion flag, and to disable sending, receiving, reading, and/or composing SMS text messages when the motion flag indicates that the communication device 102 is in motion at greater than the threshold speed. In some embodiments, an application layer 126 of the SMS protocol stack 120 may be configured to obtain the motion flag, and may be further configured to consider a FALSE value of the motion flag to be a prerequisite for allowing a user to send, receive, read, and/or compose SMS text messages.

In certain embodiments, the operating system 104 itself may be configured to disable certain functionality of the communication device 102 when the device 102 is in motion. For example, the operating system 104 may limit which applications 106 are allowed to run or have focus when the device 102 is moving, and/or may specify that only certain user interface elements can be displayed or be active when the device 102 is moving.

Figure 2:
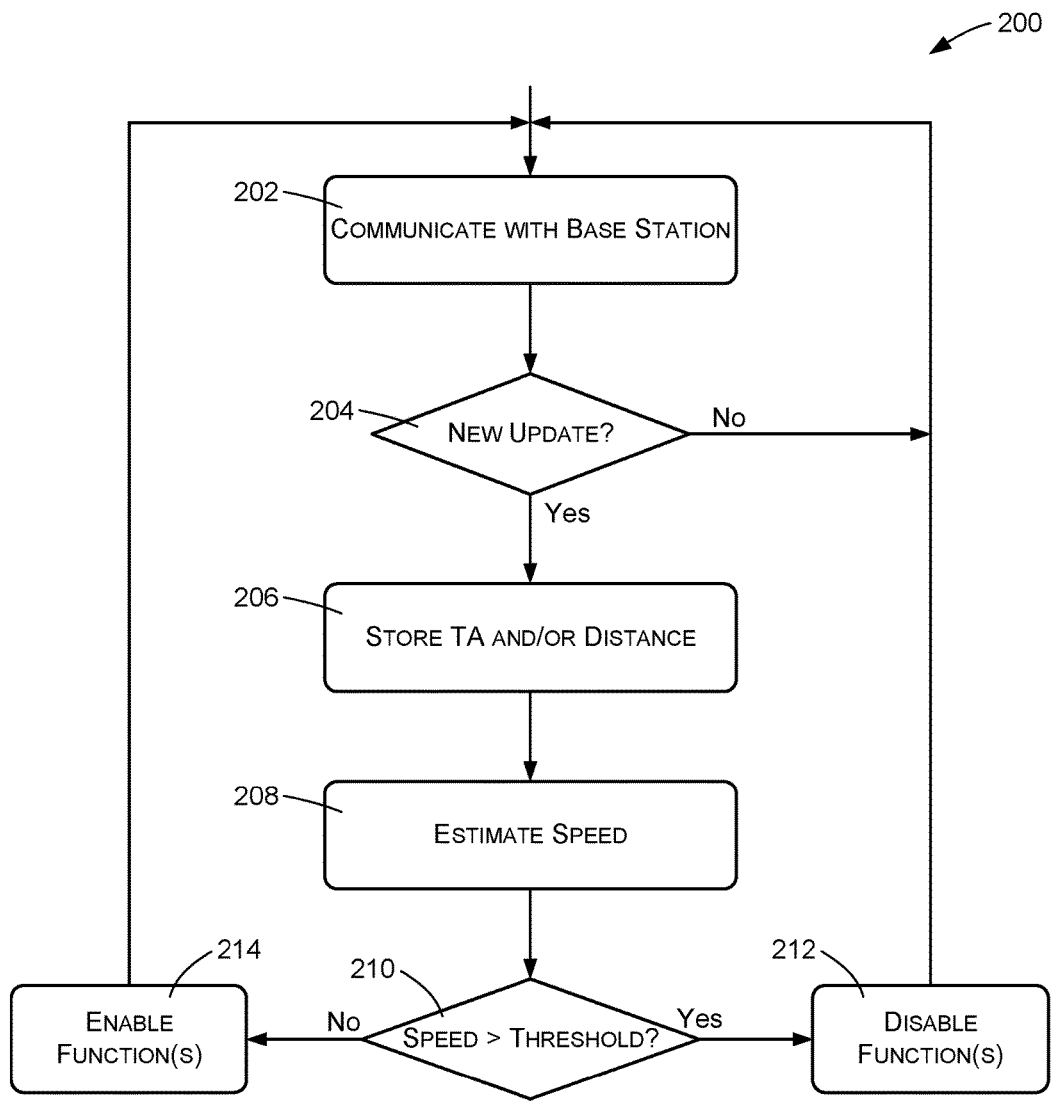
FIG. 2 is a flow diagram illustrating an example method of determining the speed of a mobile communication device and blocking certain functionality of the mobile communication device, based on timing advance values received from a base station.

FIG. 2 shows an example method 200 that may be performed by a mobile communication device, such as cellular telephone or other cellular communication device, to allow disable certain functionality of the communication device during times when it is likely that the communication device is within a moving vehicle.

An action 202 comprises communicating with a base station, such one of many base stations of a cellular communications provider. The communications may be TDMA communications, in which the communication device transmits data bursts that are timed to arrive at the base station during respective burst periods. The action 202 may include receiving timing advance value updates from the base station over time, at periodic intervals. For example, in certain embodiments the base station may be configured to send a timing advance value update every 5 seconds. Each timing advance value indicates an amount of time by which the data bursts are to be advanced by the communication device in order to reach the base station during their respective burst periods.

The communications may also include logical channels associated with SMS communications or other messaging communications, as well as logical data channels used for general packet-based communications with networks such as the Internet.

An action 204 comprises determining whether a new timing advance (TA) update has been received. If a new timing advance update has not been received, communication with the base station continues in the action 202.

If a new timing advance update has been received from the base station, an action 206 is performed of calculating and/or storing a new timing advance value in a local memory cache, where the local memory cache is used to store a predefined number of most recent timing advance values. For example, the local memory cache may store the 3 timing advance values corresponding to the most recent updates received from the base station. In various example embodiments, the local memory cache may store any number of recent timing advance values, such as anywhere from 2 to 100, or more, of such values. In certain embodiments, the local memory cache may be configured to store the 10 most recent timing advance values, as one example.

In some cases, rather than storing recent timing advance values, the values may be converted to distances, and distances corresponding to a number of most recent timing advance values may be stored in the cache. A timing advance value can be converted to a distance in accordance with Equation 1, above.

An action 208 comprises estimating the speed of the communication device by analyzing cached timing advance values, cached distances corresponding to the timing advance values, and/or the difference between cached distances or timing advance values. More specifically, the action 208 may comprise (a) converting each cached timing advance value to a corresponding distance in accordance with Equation 1, (b) for each of multiple consecutively received timing advance values, calculating a speed in accordance with Equation 2, and (c) averaging or otherwise analyzing the calculated speeds to determine an estimated speed.

An action 210 comprises determining whether a user of the communication device is likely to be in a moving vehicle. The action 210 is performed based on the estimated speed determined in the action 208, which in turn is based on differences between the most recent timing advance values and/or the distances corresponding to recent timing advance values.

More specifically, the action 210 comprises determining whether the communication device is moving at greater than a threshold speed. If the estimated speed is greater than the threshold speed, the user of the communication device is assumed to be in a moving vehicle or driving a vehicle, and an action 212 is performed of disabling one or more functions of the communication device. If the estimated speed is not greater than the threshold speed, it is assumed that the user of the communication device is not driving, and an action 214 is performed of enabling any of the one or more functions that were previously disabled in the action 212. The method 200 then is performed repeatedly, so that the one or more functions are disabled and re-enabled depending on whether the most recently estimated speed is greater than the threshold speed.

The one or more functions that are disabled and enabled in the actions 212 and 214 may comprise any functions that are likely to cause driver distraction. In particular, various aspects of text messaging or other messaging, such as reading, composing, sending, and/or receiving textual messages, may be disabled and enabled in the actions 212 and 214.

As a specific example, the action 212 may comprise blocking the transmission or reception of text messages, in response to determining that the communication device is moving at greater than the threshold speed. As another example, the action 212 may comprise preventing display of any user interface elements that might be distracting, such as those that show received messages or that allow a user to compose new messages. In some cases a notice might be displayed to the user, indicating that certain features have been disabled.

The ability to determine that the device user is likely driving a vehicle, and in response to disable text messaging and/or other distracting activities, can greatly reduce the chances of accidents that might otherwise occur as a result of texting while driving or other phone-related activities while driving.

Figure 3:
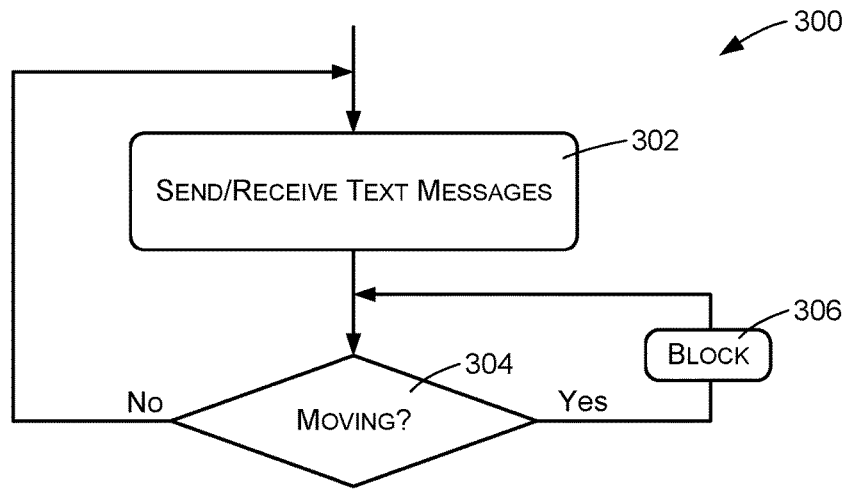
FIG. 3 is a flow diagram illustrating an example method of blocking SMS text messages based on an indication provided by the operating system of a mobile communication device that the device is moving a greater than a threshold speed.

FIG. 3 shows an example method 300 that may be performed by an SMS protocol stack of a cellular communication device in order to block text messaging when it is likely that the device is being used by a person who is driving.

An action 302 comprises sending and/or receiving text messages, which corresponds to the conventional functionality of an SMS protocol stack. The action 302 may include presenting various user interfaces that allow a user to compose and send messages, and to read received messages.

The action 302 may include communicating with an SMS center to send and receive text messages. Communications between the device and the SMS center may be over an LLC channel.

An action 304 comprises determining whether the communication device is moving, and more specifically whether the communication device is moving at greater than a threshold speed. If so, an action 306 comprises blocking further text messaging. The action 306 may be performed by looping to the action 304, without returning to the action 302. If the communication device is not moving at greater than the threshold speed, the method 300 is repeated, beginning at the action 302. Normal text messaging is thus continued as long as the communication device is not moving, or not moving faster than the threshold speed.

The actions 304 and 306 may be implemented by an application layer of the SMS protocol stack. Alternatively, in some embodiments lower layers of the SMS protocol stack may be configured to prevent transmission of SMS text messages when the communication device is moving at greater than the threshold speed.

In certain embodiments, the action 304 may comprise calling the operating system of the communication device to determine whether the communication device is moving at greater than the threshold speed. In embodiments such as this, the operating system is configured to obtain timing advance values and to analyze the values as described above to estimate a current speed of the communication device. The operating system may then provide a flag having a TRUE value or a FALSE value, indicating that the device is moving at a relatively fast speed (such as greater than a threshold speed) or not moving fast, respectively.

Figure 4:
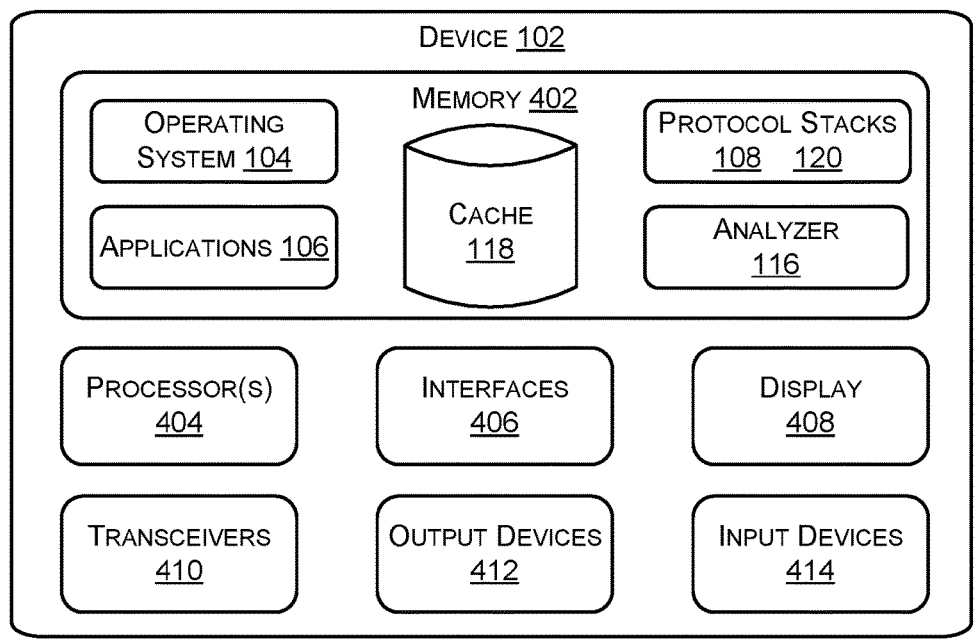
FIG. 4 is a block diagram of an example communication device that may be configured to implement the techniques described herein.

FIG. 4 illustrates an example implementation of the communication device 102 in accordance with various embodiments. The device 102 may include memory 402, which may store the operating system 104 as well as various applications 106 and associated data. The device memory 402 may also be used for the local cache 118. The protocol stacks 106 and 120, as well as the timing advance analyzer 116, may also be stored in the form of executable code in the memory 402.

The device 102 has one or more processors 404 for executing the operating system 104, the applications 106, the protocol stacks 106 and 120, and the timing advance analyzer 116. Each processor may comprise a central processing unit (CPU), a graphics processing unit (GPU), or other processing unit or component known in the art.

Generally, the memory 402 stores one or more sets of instructions (e.g., software) such as a computer-executable program that embodies operating logic for implementing and/or performing any one or more of the methodologies or functions described herein as being performed by the communication device 102. Supporting or associated data is also stored by the memory 402. The instructions and/or data may reside, completely or at least partially, within the memory 402 and within the processor 404 during execution thereof by the device 102.

In various embodiments, the memory 402 may include both volatile memory and non-volatile memory. The memory 402 can also be described as non-transitory computer storage media/memory, machine-readable media/memory, or computer-readable media/memory, and may include removable and non-removable media implemented in any method or technology for storage of information, such as computer readable instructions, data structures, program modules, or other data.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 102. Any such non-transitory computer-readable media may be part of the device 102.

The device 102 may have interfaces 406 such as are known in the art. The interfaces 406 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the device 102 may have a display 408 such as a liquid crystal display or any other type of display commonly used in telecommunication devices or other portable devices. For example, the display 408 may be a touch-sensitive display screen, which may also act as an input device or keypad, such as for providing a soft-key keyboard, navigation buttons, or the like.

The communication device 102 may also include one or more transceivers 410, which may include any sort of transceivers known in the art. For example, the transceivers 410 may include radio radios and/or radio transceivers and interfaces that perform the function of transmitting and receiving radio frequency communications via an antenna, through a cellular communication network of a cellular communications carrier. The radio interfaces facilitate wireless connectivity between the device 102 and various cell towers, base stations and/or access points.

The communication device 102 may have output devices 412, which may include any sort of output devices known in the art, such as a display (already described as display 408), speakers, a vibrating mechanism, or a tactile feedback mechanism. The output devices 412 also include ports for one or more peripheral devices, such as headphones, peripheral speakers, or a peripheral display.

The communication device 102 may have input devices 414, which may include any sort of input devices known in the art. For example, the input devices 414 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:
1. A communication device comprising:
   a processor;
   a memory that stores instructions that are executed by the processor;
   a network protocol stack stored in the memory of the communication device, wherein the network protocol stack communicates with a base station by transmitting data bursts to arrive at the base station during respective burst periods;
   the network protocol stack being configured to receive updates from the base station that specify timing advance values over time, each timing advance value indicating an amount of time by which transmissions of data bursts are to be advanced by the communication device in order for the data bursts to reach the base station during the respective burst periods;
a short messaging service (SMS) protocol stack stored in the memory, wherein the SMS protocol stack implements communications between the communication device and an SMS center to send and receive SMS text messages;
a timing advance analyzer stored in the memory of the communication device, the timing advance analyzer being configured for execution by the processor to determine that a user of the communication device is in a moving vehicle based at least in part on differences between multiple ones of the timing advance values; and
the SMS protocol stack being configured to block an SMS text message in response to the timing advance analyzer determining that the user of the communication device is in the moving vehicle.

2. The communication device of claim 1, wherein the timing advance analyzer is configured to average the multiple ones of the timing advance values.

3. The communication device of claim 1, further comprising an operating system stored in the memory, wherein the operating system implements the timing advance analyzer.

4. The communication device of claim 3, wherein the SMS protocol stack comprises an application layer, the application layer being configured to call the operating system to (a) receive data indicating that the user of the communication device is in the moving vehicle and (b) block the SMS text message.

5. The communication device of claim 1, wherein the timing advance analyzer is configured to determine whether the communication device is moving at greater than a threshold speed.

6. The communication device of claim 1, wherein the SMS protocol stack blocks the SMS text message by preventing transmission of the SMS text message.

7. The communication device of claim 1, wherein the timing advance analyzer compares at least three of the timing advance values to determine an estimated speed of the communication device.

8. The communication device of claim 7, wherein the timing advance analyzer compares the estimated speed to a threshold speed to determine that the user of the communication device is in the moving vehicle.

9. The communication device of claim 1, wherein the timing advance analyzer is configured to determine an estimated speed of the moving vehicle.

10. The communication device of claim 3, wherein the operating system is configured to respond to a request to receive an estimated speed of the moving vehicle.

11. The communication device of claim 3, wherein the operating system is configured to indicate that the communication device is in a moving vehicle, and wherein the SMS protocol stack is configured to receive an indication from the operating system that communication device is in a moving vehicle.

12. The communication device of claim 3, wherein the SMS protocol stack is configured to receive an indication from the operating system indicating that the communication device is vehicle that is not moving, and wherein the SMS protocol stack is configured to send an SMS text message.

13. The communication device of claim 1, wherein at least one of the timing advance values represents an absolute value or an incremental value.

14. The communication device of claim 1, wherein the timing advance analyzer is configured to determine an estimated speed of the moving vehicle based in part on different threshold speeds.

15. The communication device of claim 1, wherein the communication device further comprises a display.

16. The communication device of claim 1, wherein the SMS protocol stack is configured to prevent display on the communication device of (1) a message or (2) a user interface to compose a new message.

17. One or more computer-readable media storing an application that is configured for execution by one or more processors of a communication device to perform actions comprising:
transmitting data bursts to arrive at a base station during respective burst periods;
receiving updates from the base station that specify timing advance values over time, each timing advance value indicating an amount by which the data bursts are to be advanced by the communication device in order for the data bursts to reach the base station during the respective burst periods;
communicating with a short message service (SMS) center to send and receive SMS text messages;
analyzing multiple ones of the timing advance values to determine that the communication device is moving at greater than a threshold speed; and
blocking a text message in response to determining that the communication device is moving at greater than the threshold speed.

18. The one or more computer-readable media of claim 17, wherein the multiple ones of the timing advance values comprise at least three of the timing advance values.

19. The one or more computer-readable media of claim 17, wherein the multiple ones of the timing advance values comprise at least three of the timing advance values and the analyzing comprises averaging the at least three of the timing advance values.

20. The one or more computer-readable media of claim 17, wherein the blocking comprises preventing transmission of a short message service (SMS) text message from the communication device.

21. The one or more computer-readable media of claim 17, further comprising a short message service (SMS) protocol stack stored in the one or more computer-readable media, the blocking being performed by the SMS protocol stack.

22. The one or more computer-readable media of claim 17, wherein the analyzing comprises analyzing differences between the multiple ones of the timing advance values to determine an estimated speed of the communication device.

23. A method performed by a communication device, the method comprising:
transmitting data bursts to arrive at a base station during respective burst periods;
receiving updates from the base station that specify timing advance values, each timing advance value indicating an amount of time by which the data bursts are to be advanced by the communication device in order for the data bursts to reach the base station during the respective burst periods;
analyzing multiple ones of the timing advance values to determine that the communication device is moving at greater than a threshold speed; and
disabling a functionality of the communication device in response to determining that the communication device is moving at greater than the threshold speed.

24. The method of claim 23, wherein the analyzing comprises comparing at least three of the timing advance values to determine an estimated speed of the communication device.

25. The method of claim 23, wherein the analyzing comprises averaging at least three of the timing advance values to determine an estimated speed of the communication device.

26. The method of claim 23, wherein blocking the functionality comprises disabling text messaging from the communication device.

27. The method of claim 23, wherein the analyzing is based at least in part on differences between the multiple ones of the timing advance values.

28. The method of claim 23, wherein the disabling is performed by a short message service (SMS) communication protocol stack of the communication device.

* * * * *